UNITED STATES PATENT OFFICE.

VICTOR H. CHRISTEN, OF TOLEDO, OHIO.

RAIN-WIPER FOR WIND-SHIELDS.

1,201,440.   Specification of Letters Patent.   Patented Oct. 17, 1916.

No Drawing.   Application filed July 3, 1915.   Serial No. 37,929.

*To all whom it may concern:*

Be it known that I, VICTOR H. CHRISTEN, a citizen of the United States, residing at Toledo, in the county of Lucas and State of Ohio, have invented new and useful Improvements in Rain-Wipers for Wind-Shields, of which the following is a specification.

My invention relates to a rain wiper for wind shields and other window glasses, and has for its object to provide a wiper fabric that has been treated with a composition adapting the wiper fabric when rubbed over the surface of a glass that is wet with rain to put the surface of the glass in a condition that rain will not form in drops thereon, but will spread smoothly and evenly thereon and run therefrom in a transparent film that does not obstruct the view through the glass.

A further object is to provide a composition for treating the fabric, and carried thereby and combined therewith, whereby the fabric is made adapted when rubbed over the surface of glass moistened with rain, to impart a clearness to the surface of the glass without discoloration or stickiness, and that prevents rain from accumulating in drops thereon.

I accomplish these objects by first mixing together the materials hereinafter described substantially in the proportions and in the manner as hereinafter set forth, then saturate fabric with the composition and thoroughly dry it thereon, whereby the fabric is made adapted to carry and apply the composition to glass surfaces, as hereinafter described.

My composition is composed of the following materials in the proportions following, to-wit:—resin oil, thirty-five parts; whiting, fifty-seven parts; petrolatum, seven and one-half parts; lamp black, one-half a part.

The composition is formed as follows:— The resin oil and the petrolatum are put in a boiler together and heated and mixed together until the mixture is an emulsion of the consistency of cream. The whiting and lamp black are then added slowly and the whole composition is then stirred for one half hour, after which it is allowed to cool for twenty-four hours before being applied.

The composition thus formed is applied to any suitable fabric—preferably finely woven cheese cloth,—as follows:—The cloth is passed between two rubber covered rollers with suitable adjustment to produce a desired pressure of the rollers on the cloth. The composition is allowed to flow on the upper roller and is evenly pressed into the cloth as it passess between the rollers. After the cloth has been treated with the composition, it is exposed to the sun from three to four days until it is thoroughly dry, after which it is cut into desired lengths suitable for wipers, which are preferably packed in metal tubes.

The wiper thus treated with the composition, and prepared for use, is applied as follows:—After rain has wet the surface of the wind shield or glass the wiper is moved briskly over the wet window or shield. By this operation a thin colorless transparent film of the composition is spread over the surface of the glass, which is adapted to cause rain falling thereon to also spread thinly and evenly over the surface and flow off without forming into drops or clouding the glass.

In using the wiper it is preferably folded to the size of the hand and after using one portion several times it is refolded to bring other portions into use. A wiper may be used many times before the composition is exhausted.

It is obvious that the wiper may be advantageously used to keep the motorman's and engineer's outlook windows of street cars and locomotives clear and free from rain drops, as well as the wind shields of automobiles, and I therefore do not limit its use to wind shields alone.

While the materials forming my composition are preferably mixed in the proportions hereinbefore stated, it is obvious that the proportions may be varied to some extent without materially reducing the effectiveness of the wiper to prevent the formation of rain in drops on the surface of a wind shield or window glass, and I therefore do not limit myself in forming my composition to the exact proportions stated.

It is obvious also that in drying the composition on and in the fabric after treatment as described, artificial heat may be employed instead of sun drying, without departing from the principle of my invention, I therefore do not limit myself to sun drying only.

My wiper when prepared as described, may be used without soiling or discoloring the hands, or leaving the surface of the glass on which it is used, sticky or discolored.

What I claim to be new is—

As an article of manufacture and use, a rain wiper for wind shields and the like, comprising a piece of fabric saturated with a composition and dried, said composition comprising an emulsion formed by mixing and heating together proportionate quantities of resin oil and petrolatum, substantially as set forth, and having mixed therewith, while heated, quantities of whiting and lampblack in proportions substantially as set forth.

In testimony whereof I have hereunto set my hand at Toledo, Ohio, this 30th day of June, 1915, in the presence of two subscribing witnesses.

VICTOR H. CHRISTEN.

In presence of—
ALBERT T. GOORLEY,
A. F. HANSON.